US012366059B2

(12) United States Patent
Sansum

(10) Patent No.: US 12,366,059 B2
(45) Date of Patent: Jul. 22, 2025

(54) ABLUTIONARY FITTING

(71) Applicant: KOHLER MIRA LIMITED, Gloucestershire (GB)

(72) Inventor: Nigel Paul Sansum, Cheltenham (GB)

(73) Assignee: Kohler Mira Limited, Cheltenham (GB)

( * ) Notice: Subject to any disclaimer, the term of this patent is extended or adjusted under 35 U.S.C. 154(b) by 559 days.

(21) Appl. No.: 16/696,851

(22) Filed: Nov. 26, 2019

(65) Prior Publication Data

US 2020/0181895 A1 Jun. 11, 2020

Related U.S. Application Data

(63) Continuation of application No. PCT/GB2018/051484, filed on May 31, 2018.

(30) Foreign Application Priority Data

Jun. 2, 2017 (GB) ..................................... 1708850

(51) Int. Cl.
*E03C 1/08* (2006.01)
*B05B 1/26* (2006.01)
*B05B 3/00* (2006.01)

(52) U.S. Cl.
CPC ................ *E03C 1/08* (2013.01); *B05B 1/262* (2013.01); *B05B 3/008* (2013.01)

(58) Field of Classification Search
CPC .......... E03C 1/08; E03C 1/084; E03C 1/0408; E03C 1/086; B05B 1/262; B05B 1/30; B05B 1/18; B05B 1/185; B05B 3/02; B05B 3/008
USPC .......................................................... 239/231
See application file for complete search history.

(56) References Cited

U.S. PATENT DOCUMENTS

| | | | | |
|---|---|---|---|---|
| 2,974,877 | A | 3/1964 | Hruby, Jr. | |
| 3,633,824 | A | 1/1972 | Aghnides | |
| 3,647,144 | A | 3/1972 | Grant et al. | |
| 3,791,584 | A | 2/1974 | Drew et al. | |
| 4,398,669 | A * | 8/1983 | Fienhold | B05B 1/1654 239/447 |
| 6,199,771 | B1 * | 3/2001 | Clearman | B05B 3/0445 239/231 |
| 6,245,390 | B1 | 6/2001 | Baranovski et al. | |

(Continued)

FOREIGN PATENT DOCUMENTS

| | | |
|---|---|---|
| CN | 2471420 | 1/2002 |
| CN | 201446027 | 5/2010 |

(Continued)

OTHER PUBLICATIONS

Examination Report on GB Appl. Ser. No. GB1708850.1 dated Jul. 20, 2021 (6 Pages).

(Continued)

*Primary Examiner* — Christopher R Dandridge
(74) *Attorney, Agent, or Firm* — Husch Blackwell LLP

(57) ABSTRACT

An ablutionary fitting includes an outlet for providing a stream of water and a dispersing barrier arranged in the stream, such that the liquid passing through the dispersing barrier is broken up into a plurality of smaller streams, forming a spray, wherein the smaller streams are at least in part directed by the dispersing barrier.

20 Claims, 9 Drawing Sheets

(56) References Cited

U.S. PATENT DOCUMENTS

| | | | | |
|---|---|---|---|---|
| 6,719,218 | B2 * | 4/2004 | Cool | B05B 3/008 239/443 |
| 7,357,337 | B2 * | 4/2008 | Ferrari | E03C 1/08 239/590.5 |
| 8,794,543 | B2 * | 8/2014 | Leber | B05B 3/04 239/562 |
| 9,067,218 | B2 * | 6/2015 | Yu | B05B 3/0427 |
| 2005/0263617 | A1 * | 12/2005 | Thong | B05B 1/1636 239/443 |

FOREIGN PATENT DOCUMENTS

| | | |
|---|---|---|
| CN | 105121754 | 12/2015 |
| CN | 106988384 | 7/2017 |
| GB | 1314584 | 4/1973 |
| JP | H796219 | 4/1995 |
| WO | WO2014/142766 | 9/2014 |

OTHER PUBLICATIONS

International Search Report and Written Opinion re Application No. PCT/GB2018/051484 issued May 9, 2018; 16 pages.

GB Search Report re Application No. GB1708850.1 issued Nov. 17, 2017; 4 pages.

GB Search Report re Application No. GB1708850.1 issued Dec. 19, 2017; 2 pages.

* cited by examiner

ABLUTIONARY FITTING

CROSS-REFERENCE TO RELATED PATENT APPLICATIONS

The present application is a Continuation of International Application No. PCT/GB2018/051484, filed May 31, 2018, which claims priority to and the benefit of United Kingdom Patent Application No. GB 1708850.1, filed Jun. 2, 2017. The entire disclosures of each of the aforementioned applications are incorporated herein by reference, including their specifications, drawings, claims and abstracts.

BACKGROUND

The present application relates to an ablutionary fitting. In particular, but not exclusively, the present application relates to ablutionary fittings that provide sprays with controllable patterns and characteristics. More particularly, the present application relates to shower heads that provide particular sprays with controllable patterns and characteristics.

Shower heads which form a spray pattern are known. Typically, the spray pattern is formed by a plate having an arrangement of holes. Water is forced through the holes, so that the spray pattern follows the arrangement of holes.

To provide improved user experience it can be desirable to create a range of spray patterns. It is particularly desirable to be able to create spray patterns using low water flow rates, since this improves water economy. It is also desirable to create similar spray patterns in other types of water outlet.

SUMMARY

One embodiment relates to an ablutionary fitting that includes an outlet for providing a stream of water and a dispersing barrier arranged in the stream, such that the liquid passing through the dispersing barrier is broken up into a plurality of smaller streams, forming a spray, wherein the smaller streams are at least in part directed by the dispersing barrier.

BRIEF DESCRIPTION OF THE DRAWINGS

Embodiments will now be described, by way of example only, with reference to the accompanying drawings, in which:

FIG. 1B schematically illustrates the mesh of FIG. 1A, front on;

DETAILED DESCRIPTION

Figure 1A:
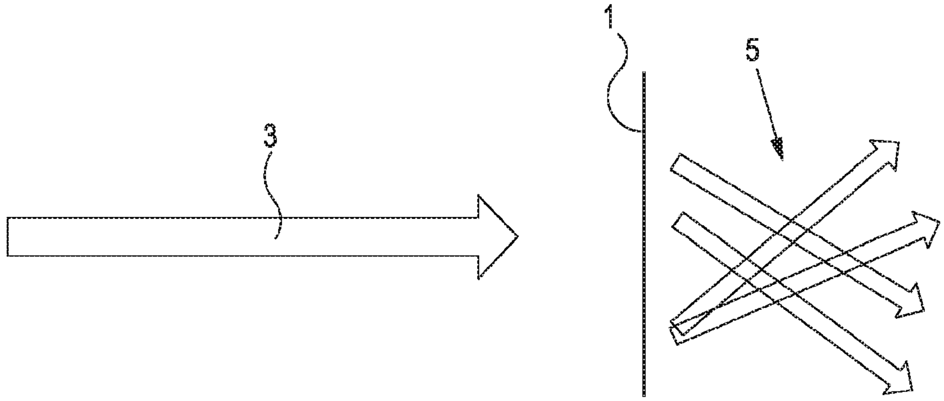
FIG. 1A schematically illustrates how a wire mesh can be used to form a spray pattern in a stream of water.

According to a first aspect, there is provided an ablutionary fitting including: an outlet for providing a stream of water; and a dispersing barrier arranged in the stream, such that the liquid passing through the dispersing barrier is broken up into a plurality of smaller streams, forming a spray, wherein the smaller streams are at least in part directed by the dispersing barrier.

The ablutionary fitting a provides a spray pattern which can be controlled in a number of ways, to alter the characteristics and pattern of the spray.

The dispersing barrier comprises a mesh. The mesh may be formed of a first set of substantially parallel wires running in a first direction, and a second set of substantially parallel wires running in a second direction, substantially perpendicular to the first direction. The first set of wires may comprise wires of a first shape cross section, and the second set of wires may comprise wires of a second shape cross section, different to the first. The first set of wires may comprise wires having a first size; and the second set of wires may comprise wires having a second size, different to the first size, the size of the wires being measured as the largest dimension of the wire. The first set of wires and second set of wires may be arranged in an interlacing weave pattern; and the weave pattern at least in part determines the characteristics and pattern of the spray. The weave pattern may be selected from a list including the following: twill weave; plain weave; betamesh weave; robusta weave; duplex weave; and square weave.

The controllable parameters of the mesh, such as direction of the wires, cross-section and size of the wires, the interweaving patterns (or not) and the like can all be used to control the effect, pattern and feel of the spray.

The first set of wires may be provided in a first plane, and second set of wires may be provided in a second plane, adjacent the first plane. This can be used to control the characteristics and pattern of the spray, and also allows the sets of wires to be separated, to remove dirt and clogs.

The dispersing barrier comprises a plate, having a plurality of through passages, the through passages angled with respect to a surface of the plane. The use of a plate with though passages provides an alternative way to control the pattern of the spray, by varying the arrangement, number and size of through passages.

The outlet may comprise a nozzle having an outlet aperture arranged to form the stream as a jet. The use of a jet allows sprays to be formed with a low pressure water supply, reducing water consumption.

The nozzle and/or dispersing barrier may be arranged to move. The movement may include rotation about an axis substantially perpendicular to a plane of the dispersing barrier, wherein rotation optionally includes continuous rotation in a clockwise or anti-clockwise direction about the axis, or oscillation about the axis, or a combination of both to produce an orbital motion. The movement may include wobbling and/or translational movement. The nozzle and/or dispersing barrier may be able to move at different speeds, and wherein the speed of movement, at least in part, controls the characteristics and pattern of the spray.

The different types and speeds of movement can be used to control the characteristics and pattern of the spray.

The nozzle may include a plurality of outlet apertures, each outlet aperture arranged to provide a jet, wherein the number of the outlet apertures at least in part determines the characteristics and pattern of the spray. The outlet apertures may be arranged over the surface of the nozzle, wherein the pattern of the outlet apertures at least in part determines the characteristics and pattern of the spray. The outlet apertures may be arranged asymmetrically on the nozzle. Each outlet aperture may form a first angle between a first axis perpendicular to a plane defined by the dispersing barrier and an axis perpendicular to the outlet aperture, and wherein at least some of the plurality of outlet apertures form different first angles to each other, wherein the first angle of each outlet aperture at least in part determines the characteristics and pattern of the spray. The circumferential position of each outlet aperture may be described by a second angle defined as a rotational angle in the plane of the dispersing barrier, wherein at least some of the plurality of outlet apertures form different second angles to each other, wherein the second angle of each outlet aperture at least in part determines the characteristics and pattern of the spray. At least some of the outlet apertures are of different size and/or shape to each other, wherein the size and/or shape of each outlet aperture at least in part determines the characteristics and pattern of the spray.

The different parameters that can be varied in then nozzle, including number, size and position of the outlet apertures can be used to control the characteristics and pattern of the spray.

The ablutionary fitting may include two or more nozzles, each arranged to provide one or more jets. The number of nozzles can also be used to control the characteristics and pattern of the spray. Each nozzle may be arranged to move independently of the others.

The surface of the nozzle may be perpendicular to the direction of the passageway, in the region of the outlet aperture. This helps to provide smooth jets to the dispersing barrier.

The dispersing barrier may be spaced from the outlet, and optionally the ablutionary fitting including holding means for holding the dispersing barrier in a spaced arrangement with the outlet, such that the dispersing barrier is provided a distance in front of the outlet. The ablutionary fitting may comprise first spacer means arranged to alter the distance between the dispersing barrier and the outlet, wherein the distance that the dispersing barrier is held in front of the outlet at least in part determines the characteristics and pattern of the spray.

The spacing of the dispersing barrier from the outlet can be used to control the characteristics and pattern of the spray. By altering the spacing, focal points can be created in the pattern of the spray, and the focal points can be moved.

The ablutionary fitting may comprise two or more dispersing barriers. At least some of the dispersing barriers may be arranged consecutively, such that liquid passes through the dispersing barriers in series, optionally wherein at least some of the dispersing barriers are non-parallel to each other. The ablutionary fitting may include second spacer means for altering the distance between the dispersing barriers, wherein the distance between the dispersing barriers at least in part determines the characteristics and pattern of the spray. Alternatively, the distance between the dispersing barriers may be fixed.

The use of dispersing barriers in series, and altering the spacing of the dispersing barriers (or the spacing of the dispersing barriers to the nozzle) can be used to control the characteristics and pattern of the spray. By altering the spacing, focal points can be created in the pattern of the spray, and the focal points can be moved.

At least some of the dispersing barriers may be arranged in the same plane, and the dispersing barriers may form different patterns in the spray. The ablutionary fitting may include means for selecting one of the dispersing barriers arranged in the same plane, such that the stream of liquid passes through the selected dispersing barrier. One or more of the dispersing barriers may be tilted or tiltable relative to the plane. The dispersing barriers arranged in the same plane may be joined together, to form a single, or combined, dispersing barrier with varying characteristics in different regions.

The provision of different dispersing barriers in the same plane allows different patterns to be created in the spray, to control the characteristics and pattern of the spray. Providing means for selecting one of the dispersing barriers gives the user control over the characteristics and pattern of the spray A first set of dispersing barriers may be arranged in a first plane, and a second set of dispersing barriers may be arranged in a second plane, such that a selected dispersing barrier from the first set and a selected dispersing barrier from the second set are arranged consecutively, such that liquid passes through the selected dispersing barriers in series. The ablutionary fitting may include means for selecting one of the dispersing barriers in the first set, such that the stream of liquid passes through the selected dispersing barrier from the first set, and means for selecting one of the dispersing barriers in the second set, such that the stream of liquid passes through the selected dispersing barrier from the second set, wherein the dispersing barrier from the first set can be selected independently from the dispersing barrier from the second set.

The provision of sets of dispersing barriers in different planes allows different combinations of dispersing barriers to be used in series, to control the characteristics and pattern of the spray. Providing means for selecting the dispersing barriers gives the user control over the characteristics and pattern of the spray.

The dispersing barrier may have a regular repeating pattern including a plurality of openings, the size and shape of each opening at least in part determining the characteristics and pattern of the spray.

The edges of the openings may be arranged to cause the spray to be formed by the Coanda effect.

The dispersing barrier may be resiliently deformable. The dispersing barrier may be arranged to resiliently deform under pressure of the stream. Deformation of the dispersing barrier may be used to control the characteristics and pattern of the spray.

The dispersing barrier may define a plane, the plane substantially perpendicular to the stream of water. Alternatively, the dispersing barrier may define a plane, the plane substantially non-perpendicular to the stream of water. The arrangement of the dispersing barrier relative to the stream of water may be used to control the characteristics and pattern of the spray.

At least part of the dispersing barrier may project away from the plane, such that the dispersing barrier is three dimensional. The use of three dimensional dispersing barriers may be used to control the characteristics and pattern of the spray.

The ablutionary fitting may include air induction means for mixing air into the stream of water. The mixing of air into the stream may reduce water consumption in creating the spray.

The ablutionary fitting may comprise a shower head.

According to a second aspect, there is provided a nozzle for an ablutionary fitting having: two or more outlet apertures, each outlet aperture for forming a jet of liquid; and through passages connecting each outlet aperture to an inlet area formed in a base of the nozzle.

The nozzle can be used to form one or more jets, in different patterns.

The nozzle may be arranged to move. The speed of movement of the nozzle may be controllable. The movement may be caused by water passing through the nozzle. The movement may include rotation, about a longitudinal axis of the nozzle. Rotation may include continuous rotation in a clockwise or anti-clockwise direction about the axis, or oscillation about the axis, or a combination of both to produce an orbital motion. Movement may include wobbling and/or translational movement.

The movement of the nozzle can be used to control the patterns and characteristics of the jets formed.

The outlet apertures may be arranged over the surface of the nozzle.

The surface of the nozzle may be perpendicular to the direction of the through passage, in the region of the outlet aperture. This helps to provide smooth jets.

The outlet apertures may be arranged asymmetrically on the nozzle. The nozzle may extend in a longitudinal direction defining a central axis, passing through the center of the nozzle, wherein each through passage forms a first angle between the central axis, and an axis defined by the through passage, wherein at least some of the plurality of through passages may form different first angles to each other. Each outlet aperture forms a second angle, defining a rotational position about the central axis, wherein at least some of the plurality of outlet apertures may form different second angles to each other. At least some of the outlet apertures may be of different size and/or shape to each other.

The arrangement and size of the apertures can be used to control the patterns and characteristics of the jets formed.

According to a third aspect, there is provided an ablutionary fitting including: a nozzle having an outlet aperture arranged to form a jet; and a mesh arranged in the jet, such that the liquid passing through the dispersing barrier is broken up into a plurality of smaller streams, forming a spray, wherein the smaller streams are at least in part directed by the mesh, wherein the nozzle is arranged to rotate about an axis substantially perpendicular to a plane of the mesh, wherein the rotation at least in part determines the characteristics and pattern of the spray.

According to a fourth aspect, there is provided an ablutionary fitting including: a nozzle having an outlet aperture arranged to form a jet; a mesh arranged in the jet, such that the liquid passing through the dispersing barrier is broken up into a plurality of smaller streams, forming a spray, wherein the smaller streams are at least in part directed by the mesh; holding means for holding the dispersing barrier in a spaced arrangement with the nozzle, such that the dispersing barrier is provided a distance in front of the outlet; and spacer means arranged to alter the distance between the dispersing barrier and the outlet, wherein the distance that the dispersing barrier is held in front of the outlet at least in part determines the characteristics and pattern of the spray.

According to a fifth aspect, there is provided an ablutionary fitting including: a nozzle having an outlet aperture arranged to form a jet; and two or more meshes arranged in the jet, wherein the meshes are arranged consecutively, such that liquid passes through the meshes in series and liquid passing through the dispersing barrier is broken up into a plurality of smaller streams, forming a spray, wherein the smaller streams are at least in part directed by the meshes.

According to a sixth aspect, there is provided an ablutionary fitting including: a nozzle having an outlet aperture arranged to form a jet; and a mesh arranged in the jet, such that the liquid passing through the dispersing barrier is broken up into a plurality of smaller streams, forming a spray, wherein the smaller streams are at least in part directed by the mesh.

It will be appreciated that features discussed in relation to one aspect may also be applied to the other aspect.

Turning now to the Figures, FIG. 1A schematically illustrates how a barrier 1 can be used to form a spray 5 from a jet 3 of water. In this embodiment, the barrier 1 is a wire mesh. The person skilled in the art will appreciate that a jet 3 is formed when a water supply is forced through a narrow opening, increasing the velocity of the water.

Figure 1B:
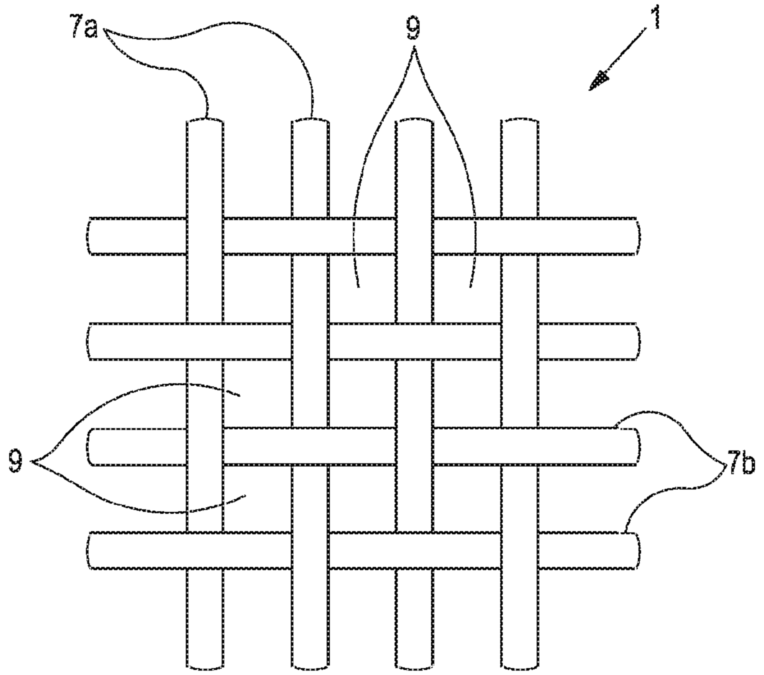

The jet 3 is directed at the wire mesh 1, which is formed as a grid of wires 7, as shown in FIG. 1B. The mesh 1 acts to break up the jet 3, to create the spray pattern 5.

In this example, the spray pattern 5 is formed because of the Coanda effect, amongst other things. As the water jet 3 passes through the mesh 5, the water from the jet 3 attaches to the curved surfaces of the wires 7 in the mesh 5. The water in the jet 3 remains attached to the wires 7 as it passes along the surfaces curved away from the initial direction of the jet 3. However, due to ongoing pressure differences, the water from the jet 3 detaches from the surface of the wire 7 erratically, e.g. at a later time or later position/point. Since the jet 3 is directed across an area of the mesh 1, this happens at a number of points, creating a spray 5. Furthermore, the spray 5 has a largely random pattern, as small pressure differences mean the behavior of the water is not predictable.

The mesh 1 is formed of a number of wires 7 that pass over and under each other to form an interlaced weave. The wires 7 in the mesh 1 are formed of a compliant material such as rubber, and are elastically deformable. Since the wires 7 are elastically deformable, the mesh 1 itself is also elastically deformable.

The wires 7 can have any shape cross section with curved edges, such that they exhibit the Coanda effect. For example, the wires 7 may be circular, or elliptical in cross section. The wires 7 may be between 0.1 mm and 10 mm, in diameter. Where the wires are not circular, the diameter is measured as the largest diameter.

Generally, the weave is made up of a first set of parallel wires 7*a* running in a first direction, and a second set of parallel wires 7*b* running in a second direction, approximately perpendicular to the first direction. The first set 7*a* and second set 7*b* are interlaced to form the weave.

Openings 9 are formed between the wires 7. Depending on the tightness of the weave, openings 9 of varying size are formed. The openings 9 may be between 0.1 mm and 10 mm in size.

A mesh 1 could be used to form a spray pattern 5 in an ablutionary fitting. An embodiment will now be described in which the mesh 1 is incorporated into a shower head 11. However, it will be appreciated that in other embodiments, the same teaching may be applied to taps, mixer taps, bidets, pull out sprays for showers or sinks (including kitchen sinks), or other types of ablutionary fittings.

Figure 2A:
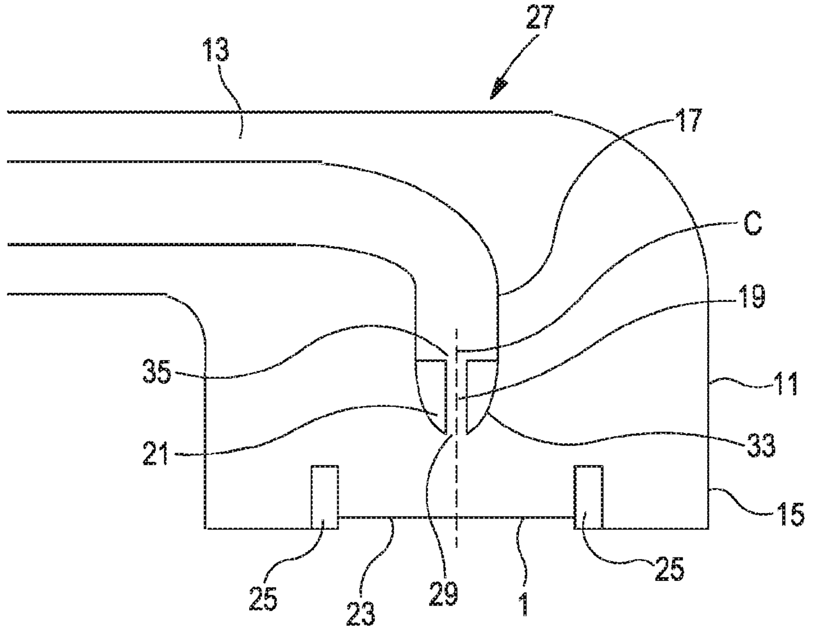
FIG. 2A schematically illustrates a cut-through view of a shower head incorporating a wire mesh for generating a spray pattern.

FIG. 2A illustrates an example of a cut-through cross section of a shower head 11 that incorporates a mesh 1 to form a spray 5 as discussed above. The shower head 11 is incorporated into a handset 27 (only part is shown). The handset 27 may be connected to a hose or other water supply system (not shown), and may be held above a bath or shower tray (not shown).

The shower head 11 is formed by a housing 15 defining a volume 13. A water conduit 17 is provided, to deliver water into the handset 27. At the end of the conduit 17, a nozzle 21 is provided.

The nozzle 21 is substantially cylindrical shaped with a flat base 31, and a curved top surface 33, extending in a longitudinal direction. The nozzle 21 includes a narrow passage 19, extending between an inlet 35 in the base 31, and an outlet aperture 29 in the top surface 33. The passage 19 extends through the nozzle 21, along a center line C of the nozzle 21. The center line C runs through the center of the nozzle 21, perpendicular to the base 31.

Figure 2B:
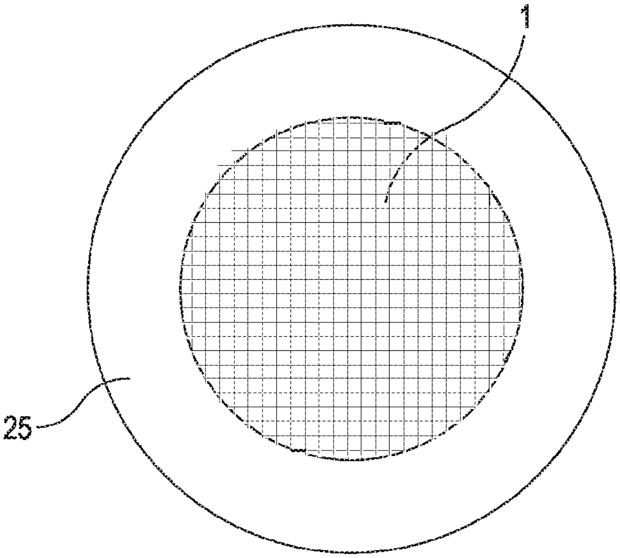
FIG. 2B schematically illustrates the mesh and holder of the shower head of FIG. 2A.

The nozzle 21 forms a jet of water 5 directed at an opening 23 in the housing 15 through which the water exits the shower head 11. A mesh 1 is provided over the opening 23, to form a spray pattern 5, and is secured in place by a holder 25. FIG. 2B shows the mesh 1 and holder 25 in end-on view, towards the mesh 1, along the center line C.

It will be appreciated that the example discussed above is just one possible arrangement of the nozzle 21.

Figure 2C:
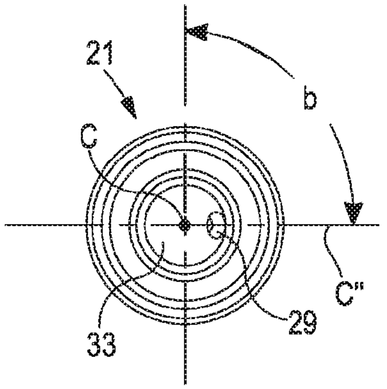
FIG. 2C schematically illustrates an alternative nozzle for use in the shower head of FIG. 2A, in front view.
Figure 2D:
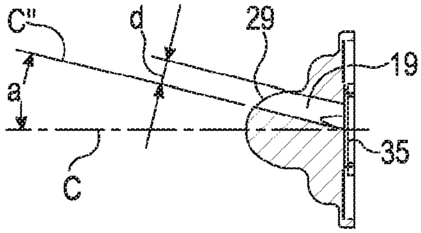
FIG. 2D schematically illustrates, in cut-through view, the alternative nozzle of FIG. 2C.

FIGS. 2C and 2D show an alternative example for the arrangement of the nozzle 21 and passage 19. In this example, there is a single outlet aperture 29 that is not located centrally.

FIG. 2C shows the outer surface 33 of the nozzle 21, in plan view along the center line C. FIG. 2D shows a cross section through the nozzle 21 to show the passage 19. In this example, the passage 19, does not extend centrally through the nozzle 21, and forms a first angle between the passage 19 and the center line C, when viewed in cross section. This first angle is shown as angle a in FIG. 2D. The first angle is defined between the center line C and a second axis C''. The second axis C'' extends from the center of the base 31 of the nozzle 21 (where the center line C meets the base 31), parallel to the passage 19. The first angle may be between 0 degrees and 45 degrees.

Furthermore, the passage may extend at any circumferential position around the center line C, measured by a second angle between an origin axis C', perpendicular to the central axis C, and an axis C'' perpendicular to the central axis C and passing through the opening 19, in the plane of the opening 19. The second angle is shown as angle b in FIG. 2C, and can be between 0 and 350 degrees.

The variation of the first angle and the second angle means that the outlet apertures 29 may be provided at any position on the outer surface 33 of the nozzle 21. Furthermore, any suitable shape may be used for the nozzle 21. The inventor has realised that configurations and combinations can be varied to provide desired specific spray effects, and also that specific configurations and combinations provide particularly desired spray effects. Spray effects can include one or more of the shape profile of a spray, the pressure of a spray, the time varying profile (frequency) of a spray.

Also, the passage 19 and outlet aperture 29, may have any diameter or size between 0.1 mm and 10 mm. The diameter is shown as d in FIG. 2D.

In the example discussed above, the nozzle 21 is provided with a single outlet aperture 29 in the outer surface 33, and a single passage 19. However, it will be appreciated that in other examples, a plurality of passages 19 and outlet apertures 29 may be provided between the inlet 35 on the base 31, and a plurality of outlet apertures 29 in the outer surface 33 of the nozzle 21. The nozzle 21 may include any number of outlet apertures 29 in its outer surface 33.

For each passage 19 and outlet aperture 29, any one or more of the first angle, second angle and diameter may be varied as discussed above. Again, the inventor has realized that configurations and combinations can be varied to provide desired specific spray effects, and also that specific configurations and combinations provide particularly desired spray effects. Spray effects can include one or more of the shape profile of a spray, the pressure of a spray, the time varying profile (frequency) of a spray.

In some, but not all, examples, the first angle may depend on the size of the outlet aperture 29, such that larger outlet apertures 29 extend further away from the center line C than smaller outlet apertures 29, or vice versa.

In some, but not all, examples, the second angle of each passage 19 may be arranged such that the outlet apertures 29 are evenly distributed around the surface 33 of the nozzle.

Figure 3A:
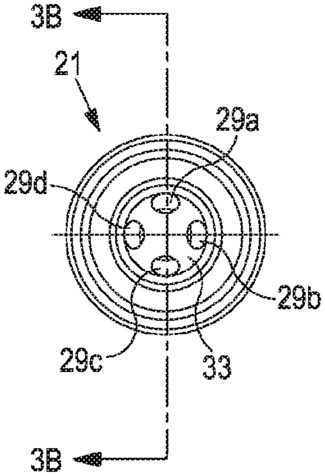
FIG. 3A schematically illustrates an alternative nozzle for use in the shower head of FIG. 2A, in front view.
Figure 3B:
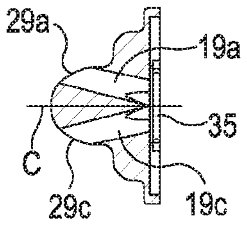
FIG. 3B schematically illustrates, in cut-through view, the alternative nozzle of FIG. 3A.
Figure 3C:
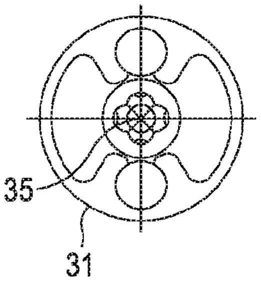
FIG. 3C schematically illustrates the nozzle of FIG. 3A, in rear view.

FIGS. 3A to 3C show a first example of a nozzle 21 including four outlet apertures 29*a-d*, such that it forms four jets 3. FIG. 3A shows the outer surface 33 of the nozzle 21, in plan view along the center line C. FIG. 3B shows cross sections through the nozzle 21 to show two of the passages 19*a, c*, and FIG. 3C shows the base 31 of the nozzle 21, in plan view along the center line C.

In this example, each of the passages 19*a-d* and outlet apertures 29*a-d* have a diameter of 2.5 mm. Each of the passages 19*a-d* is arranged at an angle of 13.7 degrees to the center line (the first angle).

The passages 19*a-d* are arranged so that the apertures 29*a-d* are evenly distributed around the surface 33 of the nozzle 21. Therefore, the second angle of the first passage 19*a* is 0 degrees, the second angle of the second passage 19*b* is 90 degrees, the second angle of the third passage 19*c* is 180 degrees, and the second angle of the fourth passage is 270 degrees.

Figure 4B:
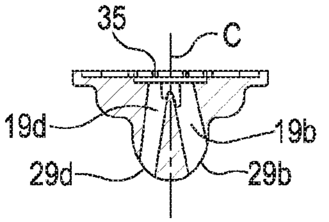
FIG. 4B schematically illustrates, in cut-through view, the alternative nozzle of FIG. 4A.
Figure 4D:
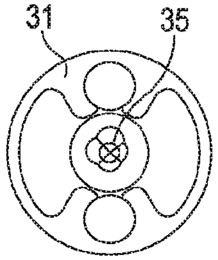
FIG. 4D schematically illustrates the nozzle of FIG. 4A, in rear view.
Figure 4A:
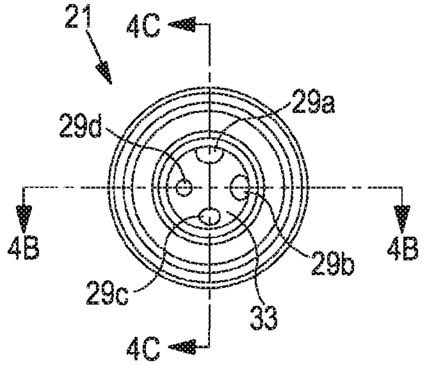
FIG. 4A schematically illustrates an alternative nozzle for use in the shower head of FIG. 2A, in front view.
Figure 4C:
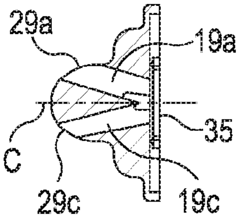
FIG. 4C schematically illustrates, in cut-through view, the alternative nozzle of FIG. 4A.

FIGS. 4A to 4D show a second example of a nozzle 21 including four outlet apertures 29*a-d*, such that it forms four jets 3. FIG. 4A shows the outer surface 33 of the nozzle 21, in plan view along the center line C. FIGS. 4B and 4C shows cross sections through the nozzle 21 to show the four passages 19*a-d*, and FIG. 4D shows the base 31 of the nozzle 21, in plan view along the center line C.

In this example, the first passage 19*a* has a diameter of 3 mm, the second passage 19*b* has a diameter of 2.5 mm, the third passage 19*c* has a diameter of 2 mm, and the fourth passage 19*d* has a diameter of 1.5 mm. The outlet apertures 29*a-d* are the same size as the passages 19*a-d*.

As discussed above, the four passages 19*a-d* diverge from the center line C at the first angle. The first angle for the first passage 19*a* is 18.4 degrees, the first angle for the second passage 19*b* is 15.4 degrees, the first angle for the third passage 19*c* is 12.4 degrees, and the first angle for the fourth passage 19*d* is 9.4 degrees. Therefore, the smaller outlet apertures 29 are close to the center of the outer surface 33.

The passages 19*a-d* are arranged so that the outlet apertures 29*a-d* are evenly distributed around the surface 33 of the nozzle 21. Therefore, the second angle of the first passage 19*a* is 0 degrees, the second angle of the second passage 19*b* is 90 degrees, the second angle of the third passage 19*c* is 180 degrees, and the second angle of the fourth passage is 270 degrees.

Figure 5B:
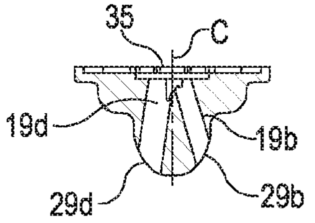
FIG. 5B schematically illustrates, in cut-through view, the alternative nozzle of FIG. 5A.
Figure 5D:
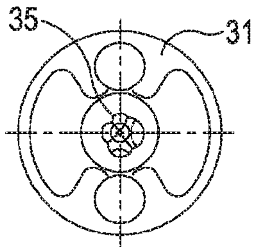
FIG. 5D schematically illustrates the nozzle of FIG. 5A, in rear view.
Figure 5A:
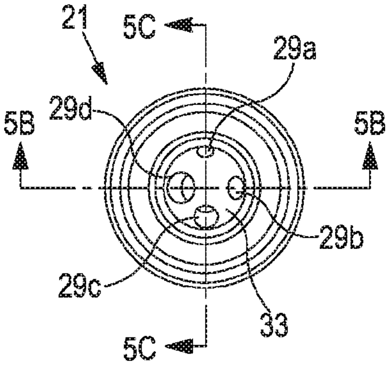
FIG. 5A schematically illustrates an alternative nozzle for use in the shower head of FIG. 2A, in front view.
Figure 5C:
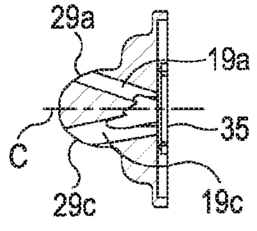
FIG. 5C schematically illustrates, in cut-through view, the alternative nozzle of FIG. 5A.

FIGS. 5A to 5D show a third example of a nozzle 21 including four outlet apertures 29*a-d*, such that it forms four jets 3. FIG. 5A shows the outer surface 33 of the nozzle 21, in plan view along the center line C. FIGS. 5B and 5C shows cross sections through the nozzle 21 to show the four passages 19*a-d*, and FIG. 5D shows the base 31 of the nozzle 21, in plan view along the center line C.

In this example, the first passage 19*a* has a diameter of 1.5 mm, the second passage 19*b* has a diameter of 2 mm, the third passage 19*c* has a diameter of 2.5 mm, and the fourth passage 19*d* has a diameter of 3 mm. The outlet apertures 29*a-d* are the same size as the passages 19*a-d*.

As discussed above, the four passages 19*a-d* diverge from the center line C at the first angle. The first angle for the first passage 19*a* is 18.4 degrees, the first angle for the second passage 19*b* is 15.4 degrees, the first angle for the third passage 19*c* is 12.4 degrees, and the first angle for the fourth passage 19*d* is 9.4 degrees. Therefore, the larger outlet apertures 29 are close to the center of the outer surface 33.

The passages 19*a-d* are arranged so that the outlet apertures 29*a-d* are evenly distributed around the surface 33 of the nozzle 21. Therefore, the second angle of the first passage 19*a* is 0 degrees, the second angle of the second passage 19*b* is 90 degrees, the second angle of the third passage 19*c* is 180 degrees, and the second angle of the fourth passage is 270 degrees.

Figure 6B:
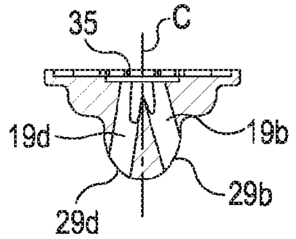
FIG. 6B schematically illustrates, in cut-through view, the alternative nozzle of FIG. 6A.
Figure 6D:
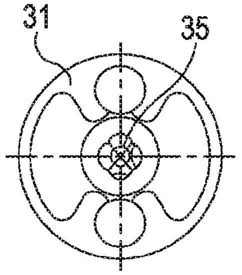
FIG. 6D schematically illustrates the nozzle of FIG. 6A, in rear view.
Figure 6A:
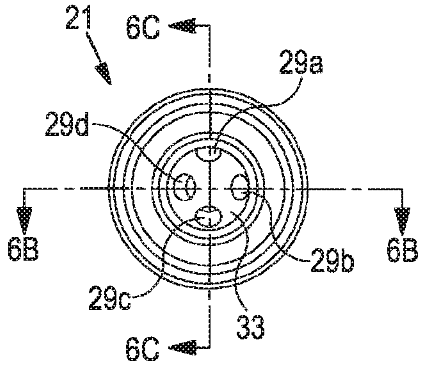
FIG. 6A schematically illustrates an alternative nozzle for use in the shower head of FIG. 2A, in front view.
Figure 6C:
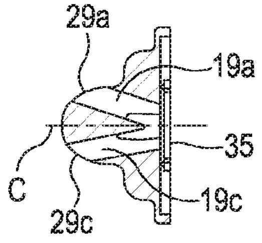
FIG. 6C schematically illustrates, in cut-through view, the alternative nozzle of FIG. 6A.

FIGS. 6A to 6D show a fourth example of a nozzle 21 including four outlet apertures 29*a-d*, such that it forms four jets 3. FIG. 6A shows the outer surface 33 of the nozzle 21, in plan view along the center line C. FIGS. 6B and 6C shows cross sections through the nozzle 21 to show the four passages 19*a-d*, and FIG. 6D shows the base 31 of the nozzle 21, in plan view along the center line C.

In this example, each of the passages 19*a-d* and outlet apertures 29*a-d* have a diameter of 2.5 mm.

As discussed above, the four passages 19*a-d* diverge from the center line C at the first angle. The first angle for the first passage 19*a* is 18.4 degrees, the first angle for the second passage 19*b* is 15.4 degrees, the first angle for the third passage 19*c* is 12.4 degrees, and the first angle for the fourth passage 19*d* is 9.4 degrees. Therefore, the outlet apertures 29 get closer to the center of the surface 33, as they move around the surface 33.

The passages 19*a-d* are arranged so that the outlet apertures 29*a-d* are evenly distributed around the surface 33 of the nozzle 21. Therefore, the second angle of the first passage 19*a* is 0 degrees, the second angle of the second passage 19*b* is 90 degrees, the second angle of the third passage 19*c* is 180 degrees, and the second angle of the fourth passage is 270 degrees.

Figure 7A:
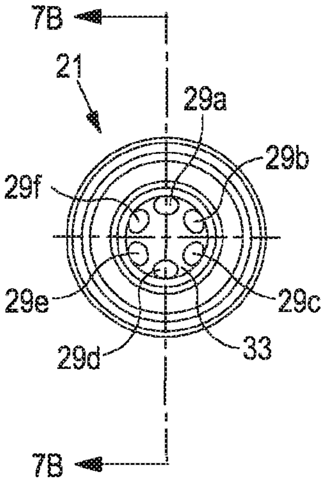
FIG. 7A schematically illustrates an alternative nozzle for use in the shower head of FIG. 2A, in front view.
Figure 7B:
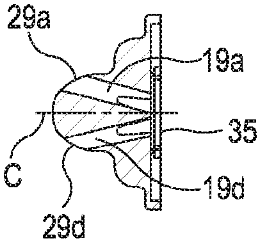
FIG. 7B schematically illustrates, in cut-through view, the alternative nozzle of FIG. 7A.
Figure 7C:
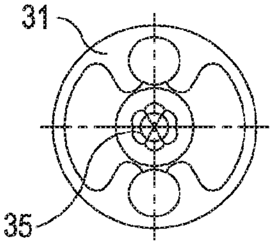
FIG. 7C schematically illustrates the nozzle of FIG. 7A, in rear view.

FIGS. 7A to 7C show a first example of a nozzle 21 including six outlet apertures 29*a-f*, such that it forms six jets 3. FIG. 7A shows the outer surface 33 of the nozzle 21, in plan view along the center line C. FIG. 7B shows cross sections through the nozzle 21 to show the passages 19*a-f*, and FIG. 7C shows the base 31 of the nozzle 21, in plan view along the center line C.

In this example, each of the passages 19*a-f* and outlet apertures 29*a-f* have a diameter of 2 mm. Each of the passages 29*a-f* is also arranged at an angle of 13.7 degrees to the center line (the first angle).

The passages 19*a-f* are arranged so that the outlet apertures 29*a-f* are evenly distributed around the surface 33 of the nozzle 21. Therefore, the second angle of the first passage 19*a* is 0 degrees, the second angle of the second passage 19*b* is 60 degrees, the second angle of the third passage 19*c* is 120 degrees, the second angle of the fourth passage 19*d* is 180 degrees, the second angle of the fifth passage 19*e* is 240 degrees, and the second angle of the sixth passage 19*f* is 300 degrees.

Figure 8A:
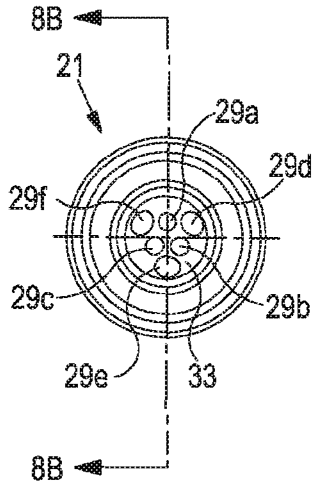
FIG. 8A schematically illustrates an alternative nozzle for use in the shower head of FIG. 2A, in front view.
Figure 8B:
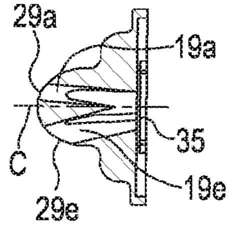
FIG. 8B schematically illustrates, in cut-through view, the alternative nozzle of FIG. 8A.
Figure 8C:
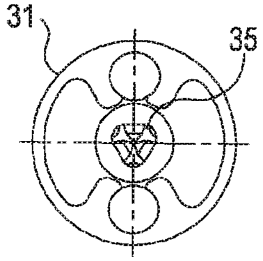
FIG. 8C schematically illustrates the nozzle of FIG. 8A, in rear view.

FIGS. 8A to 8C show a second example of a nozzle 21 including six outlet apertures 29*a-f*, such that it forms six jets 3. FIG. 8A shows the outer surface 33 of the nozzle 21, in plan view along the center line C. FIG. 8B shows cross sections through the nozzle to show the passages 19*a-f*, and FIG. 8C shows the base 31 of the nozzle 21, in plan view along the center line C.

In this example, the outlet apertures 29*a-d* are arranged in two groups. The first group is formed by the first 29*a*, second 29*b* and third 29*c* outlet apertures. The second group is formed by the fourth 29*d*, fifth 29*e* and sixth 29*f* outlet apertures.

The outlet apertures in the first group 29*a-c* have a diameter of 1.8 mm, and are arranged at an angle of 4.5 degrees to the center line (the first angle). The outlet apertures in the second group 29*d-f* have a diameter of 2.5 mm, and are arranged at an angle of 13.7 degrees to the center line (the first angle).

The passages 19*a-f* are arranged so that the outlet apertures 29*a-f* are evenly distributed around the surface 33 of the nozzle 21, with the first and second groups alternating. Therefore, the second angle of the first passage 19*a* is 0 degrees, the second angle of the second passage 19*b* is 120 degrees, the second angle of the third passage 19*c* is 240 degrees, the second angle of the fourth passage 19*d* is 60 degrees, the second angle of the fifth passage 19*e* is 180 degrees, and the second angle of the sixth passage 19*f* is 300 degrees.

Figure 9A:
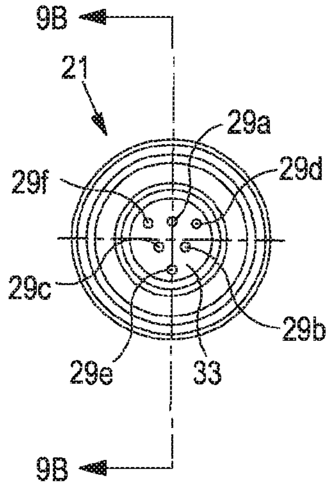
FIG. 9A schematically illustrates an alternative nozzle for use in the shower head of FIG. 2A, in front view.
Figure 9B:
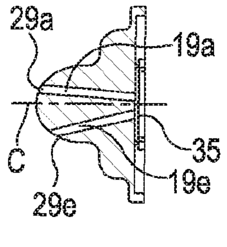
FIG. 9B schematically illustrates, in cut-through view, the alternative nozzle of FIG. 9A.
Figure 9C:
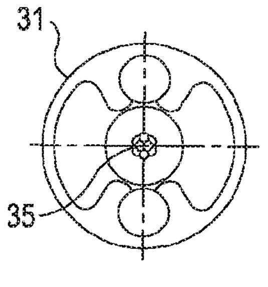
FIG. 9C schematically illustrates the nozzle of FIG. 9A, in rear view.

FIGS. 9A to 9C show a first third of a nozzle 21 including six outlet apertures 29*a-f*, such that it forms six jets 3. FIG. 9A shows the outer surface 33 of the nozzle 21, in plan view along the center line C. FIG. 9B shows cross sections through the nozzle 21 to show the passages 19*a-f*, and FIG. 9C shows the base 31 of the nozzle 21, in plan view along the center line C.

In this example, the outlet apertures 29 have a diameter of 0.85 mm.

The outlet apertures 29*a-f* are arranged in two groups. The first group is formed by the first 29*a*, second 29*b* and third 29*c* outlet apertures. The second group is formed by the fourth 29*d*, fifth 29*e* and sixth 29*f* outlet apertures.

The outlet apertures in the first group 29*a-c* are arranged at an angle of 4.5 degrees to the center line (the first angle). The outlet apertures in the second group 29*d-f* are arranged at an angle of 13.7 degrees to the center line (the first angle).

The passages 19*a-f* are arranged so that the outlet apertures 29*a-f* are evenly distributed around the surface 33 of the nozzle 21, with the first and second groups alternating. Therefore, the second angle of the first passage 19*a* is 0 degrees, the second angle of the second passage 19*b* is 120 degrees, the second angle of the third passage 19*c* is 240 degrees, the second angle of the fourth passage 19*d* is 60 degrees, the second angle of the fifth passage 19*e* is 180 degrees, and the second angle of the sixth passage 19*f* is 300 degrees.

In each of the above examples, a recessed inlet area 35 is formed in the base 31. Each of the passageways 19*a-f* opens into the inlet area 35, such that they do not intersect. This provides smooth jets 3 for delivery to the mesh(es) 1. Alternatively, the passageways 19*a-f* may intersect before the inlet area 35.

In some embodiments, the or each passageway 19*a-f* may be offset relative to the center line, C, i.e. the second axis C" does not extend from the center of the base 31 of the nozzle 21.

In the above examples, the outlet apertures 29 and passages 19 are circular. However, it will be appreciated that in some examples, the outlet apertures 29 may have different shapes, such as elongate oval openings, triangular, square and other suitable shapes. Furthermore, in the above examples, all the outlet apertures 29 have the same shape, however, this need not be the case.

The nozzles 21 discussed above are given by way of example only. It will be appreciated that, as discussed previously, the nozzle 21 may include any number of openings 29 and passageways 19. Furthermore, for each passageway 19, the first angle may be between 0 degrees and 45 degrees, and the second angle may be between 0 and 350 degrees.

Furthermore, in the above examples, the sides of the passageways 19 are parallel to each other, such that the diameter of the passageway 19 is the same along its length. In other examples, the passageways may narrow or widen towards the outlet apertures 29.

In the examples shown in FIGS. 2 to 9, the nozzle includes a curved top surface 33. However, it will be appreciated that the top surface 33 may also be flat, angular, or any other shape.

Furthermore, in the examples with a curved top surface 33, the surface 33 may be modified near the outlet apertures 29. Where an aperture is formed in a curved body, the portion of the body adjacent the aperture may partially obstruct the flow of water out of the aperture. To avoid this, the nozzle 21 may be modified so that in the region of the outlet apertures 29, the top surface 33 of the nozzle 21 is flattened so that there is a region of the surface 33 which is perpendicular to the direction of the passageway 19.

Flattening the surface 33 of the nozzle 21 near the aperture 29 provides an uninterrupted, smooth, non-turbulent flow through the nozzle 21. It will be appreciated that this is just one way of achieving this effect. The nozzle may be shaped in any manner so as not to introduce turbulence into the flow through the nozzle 21. It will also be appreciated that this feature is optional.

In all of the above examples, a single nozzle 21 is provided. However, it will be appreciated that in some examples, multiple nozzles 21 may be provided.

FIGS. 10A-10F show examples of different weave patterns that may be used in the mesh 1. In the example shown in FIG. 2B, the mesh 1 is sized to fit into the whole of the opening 23 of the shower head 11, as shown in FIG. 2B, but FIGS. 10A-10F only show a section, to illustrate the weaves.

Figure 10A:
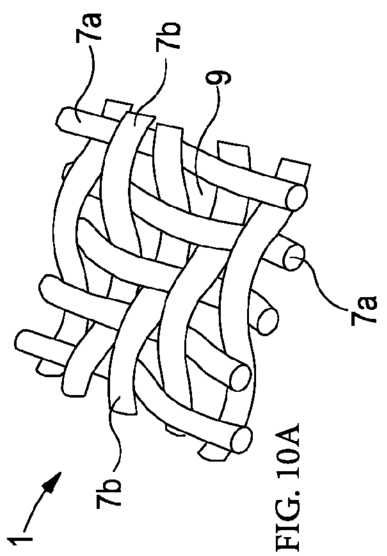
FIG. 10A illustrates a weave pattern that may be used in a wire mesh.

FIG. 10A illustrates an example of a twilled weave. In a twilled weave each wire in the second set 7*b* passes under two or more wires of the first set 7*a*, and then over one or more wires in the first set 7*b*. The adjacent wires in the second set 7*b* follow the same pattern, but the overlap is shifted along by one wire 7*a*.

In the example shown, the wires 7 are all of the same size and shape, and each wire in the second set 7*b* passes over two wires in the first set 7*a*, then under two wires in the first set 7*a*. The shift is such that where a wire in the second set 7*b* goes under two wires of the first set 7*a*, the next wire in the second set 7*b* goes over the first of the wires in the first set 7*a*, under the next two wires in the first set 7*a*, and over the fourth. This shift continues down the pattern to give a diagonal effect.

Figure 10B:
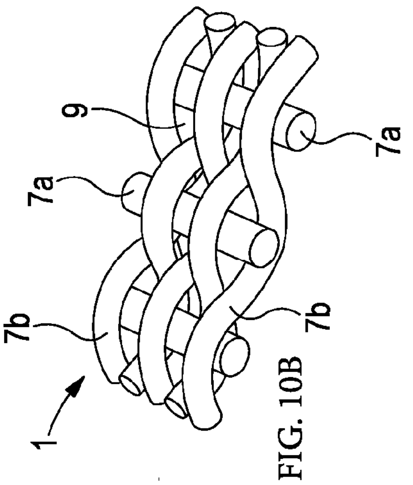
FIG. 10B illustrates a weave pattern that may be used in a wire mesh.
Figure 10C:
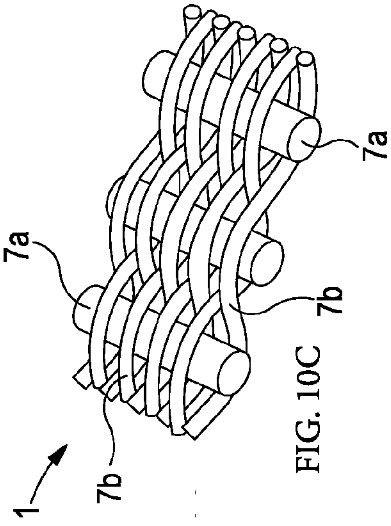
FIG. 10C illustrates a weave pattern that may be used in a wire mesh.
Figure 10D:
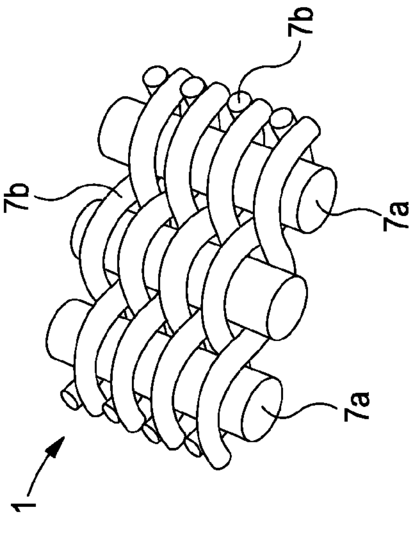
FIG. 10D illustrates a weave pattern that may be used in a wire mesh.

FIGS. 10B, 10C, and 10D illustrate examples of a plain weave, a betamesh weave and a *Robusta* weave respectively. In all of these, each wire in the second set 7*b* passes over one wire in the first set 7*a*, then under a wire in the first set 7*a*. Adjacent wires in the second set 7*b* alternate in pattern. In the example shown, the wires 7 are all of the same shape.

In the plain weave, the wires in the first set 7*a* and the wires in the second set 7*b* are the same size. The wires in the second set 7*b* gradually increase in size, relative to the wires in the first set 7*a*, for the betamesh and *Robusta*.

Figure 10E:
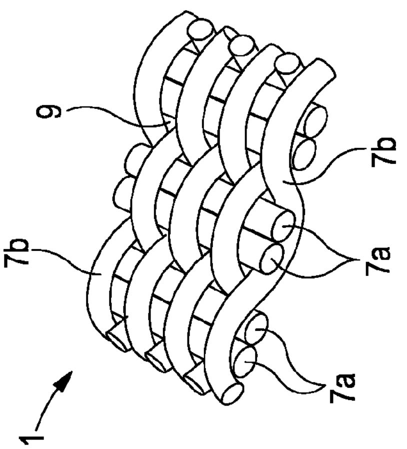
FIG. 10E illustrates a weave pattern that may be used in a wire mesh.

FIG. 10E illustrates an example of a duplex weave. This is similar to the plain weave or twill weave, except each wire in the second set 7*a* passes over two wires in the first set 7*a* and then under two wires in the first set 7*b*, and the shift between adjacent wires in the second set 7*b* is doubled, so that the pattern of the wires in the second set 7*b* alternates rather than steps.

Figure 10F:
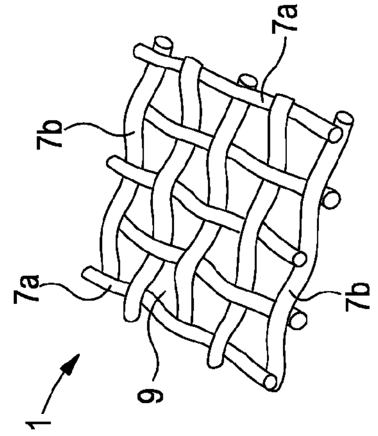
FIG. 10F illustrates a weave pattern that may be used in a wire mesh.
Figure 11A:
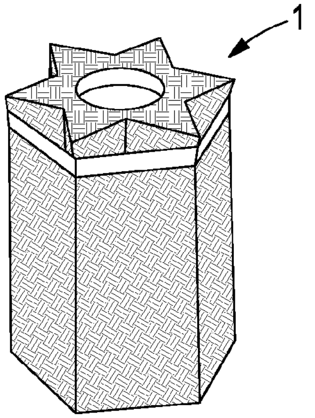
FIG. 11A illustrates an example of a three dimensional mesh.
Figure 11B:
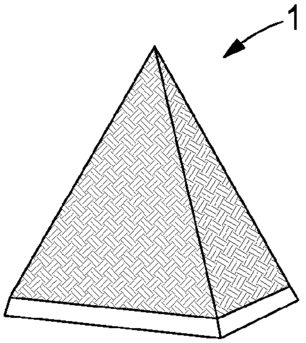
FIG. 11B illustrates an example of a three dimensional mesh.
Figure 11C:
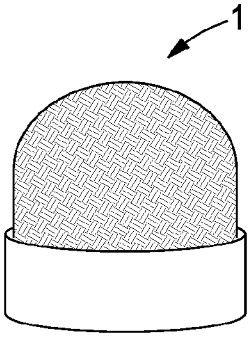
FIG. 11C illustrates an example of a three dimensional mesh.
Figure 11D:
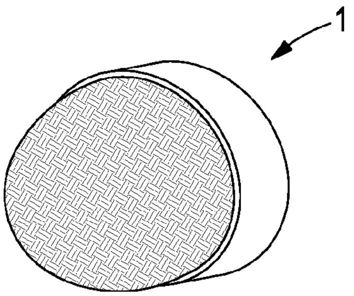
FIG. 11D illustrates an example of a three dimensional mesh.

FIG. 10F illustrates an example of a square weave. This is the same as the plain weave, with the spacing between the wires 7 increased to provide larger openings 9.

The weave patterns given above are given by way of example only. It will be appreciated that any suitable weave pattern may be used.

In the above example, the first set of wires 7*a* and second set of wires 7*b* are the same shape and material, although the size varies. It will be appreciated that the different sets 7*a,b* may comprise wires of different shape and/or different material.

In the above example, the first set of wires 7*a* is perpendicular to the second set of wires 7*b*. It will be appreciated that this may not necessarily be the case. Furthermore, in the above example, the wires in the first set of wires 7*a* are all parallel to each other, and the wires in the second set of wires 7*b* are all parallel to each other. It will also be appreciated that this may not necessarily be the case. The wires may taper towards and/or away from each other. This creates a variation in the opening 9 size across the mesh 1.

In the examples shown in FIGS. 1A, 1B, 2A, 2B and 10A-10F, the mesh 1 is a two dimensional structure (not considering the variation due to the weave).

In other examples, the mesh 1 may be shaped in three dimensions. FIGS. 11A-11D illustrate different examples of three dimensional shaped meshes 1. For example, the mesh 1 may be dome shaped, as in FIG. 11C and FIG. 11D, conical, cylindrical, a tapered cylinder, top hat, or pyramidal, as in FIG. 11B. In other examples, the three dimensional shape may be less regular, such as a star, as in FIG. 11A, or flower shaped. In a further example, the mesh 1 may be rippled. Furthermore, the three dimensional mesh 1 may be of constant width along its length, or it may taper inwardly or outwardly from the base to the tip.

In some examples, the entire mesh 1 may be shaped as described above. In other examples, the mesh 1 may include one or more planar regions, with the three dimensional pattern projecting out from other regions. For example, the mesh 1 may include a single domed region, or a number of bumps. The spray 5 formed where the jet 3 passes the three dimensional region will have different characteristics to the spray 5 formed in the planar region. The jet 3 may pass through both planar and three dimensional regions at the same time, so different regions of the spray have different characteristics, or may only pass through one of the regions at a time.

The three dimensional shape of the mesh may project towards or away from the nozzle 21 in the shower head 11.

The three dimensional shape may be derived as the permanent structure of the mesh 1. This may be achieved using a support frame or anchor points (not shown) to hold the shape of the mesh 1.

In the above example, the mesh 1 forms a circular disc. In other examples, the mesh may be any shape. For example, the mesh 1 may be in the form of an annular ring.

In some embodiments, the nozzle 21 may be arranged to rotate about the center line C. In order to rotate, the nozzle 21 must be mounted in such a manner that in can rotate about the center line C. For example, the nozzle 21 may be mounted on a shaft (not shown) secured to the shower head 11.

In one example, the rotation is driven by a turbine (not shown) driven by the incoming water. The turbine may be of the axial or radial type.

In an alternative example, the velocity of the water and distribution of the passageways 19 drives the rotation. The turbine is positioned upstream of the nozzle 21, so the water drives the turbine before entering the nozzle 21.

In a further example, lobes (not shown) are provided in the passageways 19. The lobes are formed from formations in the passageways 19 and are asymmetric in structure. Therefore, when water is incident on the lobes, it causes the nozzle 21 to rotate.

In other examples, rotation may be driven by a motor or the like (not shown).

Rotation of the nozzle 21 can create different patterns in the spray 5. The speed of rotation may also be controlled to vary the pattern of the spray 5. In general, the speed of rotation may be varied by varying the water velocity, gearing systems and the like. Means for controlling water velocity is known. For example, the water velocity may be controlled by gradually opening and closing a valve leading to the shower head 11.

In embodiments where the rotation is driven by a turbine, the speed of rotation may also be altered by varying the amount of water hitting the turbine, or by varying the number and size of blades and/or a gearing system.

In embodiments where the rotation is driven by a motor, the speed of rotation may also be controlled by varying the speed of the motor.

In the example discussed above, the nozzle 21 simply rotates around its central axis C. In one example, the rotation may be a continuous rotation around a single axis in either direction. In other examples the nozzle may rotate back and forth to create an oscillation. In yet further examples, the movement may include both rotation and oscillation to produce an orbital motion.

In examples with multiple nozzles 21, each nozzle 21 may be able to move independently of the others. Therefore, the nozzles 21 may rotate in opposite directions at the same or different speeds. In other examples, the nozzles may rotate in the same direction.

Rotation about the central axis is just one way in which the nozzle 21 may move. In other embodiments, the nozzle 21 may rotated about different axes. Alternatively, the entire nozzle 21 may move in a translation movement. The translation movement may be in any direction or path. For example, the entire nozzle may move in a circle. In yet further embodiments, the nozzle 21 may wobble about a central point.

The nozzle 21 may move in one or more of the ways discussed above at once. In addition to the speed of rotation, the speed of all of the movements may be varied. The movements are all caused by the water velocity, and so altering the water velocity can control the speed of movement.

In other embodiments, the mesh 1 may also be arranged to rotate about the central axis. The mesh 1 may also wobble, oscillate or move in other ways. The movement of the mesh 1 can be driven in the same way as the movement of the nozzle 21. In this example, a driving system may be needed to couple the mesh to the water stream that drives the rotation. The movement of the mesh is optional, and may be provided instead of or as well as the movement of the nozzle 21. As with movement of the nozzle, movement of the mesh 1 will alter the pattern in the spray 5.

As discussed above, the mesh 1 is resiliently deformable in some embodiments. The mesh 1 may be planar when not in use, and deformed by the pressure of the jet 3, to provide a three dimensional state. Once the jet 3 is removed, the mesh 1 reverts to the planar state. This may still use a support frame, or not.

The elasticity of the wires 7 and tightness of the weave can be used to control whether, and by how much, the mesh 1 deforms.

The deformation may be local to the region in which the jet 5 hits the mesh 1. Therefore, in examples with a rotating jet 5, the deformation may create a wave effect in the mesh 1, which in turn also affects the spray 5. In other examples, the mesh 1 may deform into shapes that in part form the pattern of the spray.

As discussed above, the mesh 1 is mounted in the shower head 11 by a holder 25. In some embodiments, a spacer mechanism (not shown) is provided to alter the distance between the mesh 1 and the nozzle 21, upon user actuation. For a single mesh, the distance between the mesh 1 and the nozzle 21 may be between 0.1 mm and 500 mm. In some examples, the distance may be between 0.1 mm and 200 mm. Optionally, the distance may be between 0.1 mm and 100 mm.

The spacer mechanism may be provided by any suitable mechanism such as a cam mechanism, a screw thread interacting with an engaging screw thread in the housing 15 of the shower head 11, a lever or a ratchet. In the above example, the spacer mechanism moves the mesh 1 to alter the distance between the nozzle 21 and the mesh 1. However, in other examples, the spacer mechanism may move the nozzle 21.

The pattern of the spray 5 may have one or more focal and or divergent points, where the separate streams in the spray 5 converge, diverge or create some other effect. Varying the distance between the nozzle 21 and the mesh 1 will vary these point(s).

A planar or 3D mesh defines a plane. In the examples discussed above, the plane of the mesh 1 is perpendicular to the centerline C of the nozzle 21. In other examples, this may not be this case, or the angle between the centerline C of the nozzle 21 and the plane of the mesh 1 can be varied. This may be tilting the nozzle 21 and/or the mesh 1.

Figure 12:
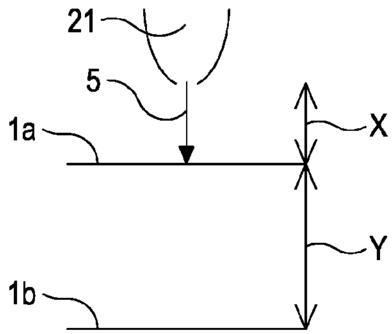
FIG. 12 schematically illustrates an alternative arrangement of the shower head of FIG. 2A.

In the examples discussed in relation to FIG. 2A, a single mesh 1 is provided in the path of the water jet 3. FIG. 12 illustrates an alternative arrangement for the shower head 11.

In the example shown in FIG. 12, there is a first mesh 1*a* in the stream of the jet 3 from the nozzle 21. As in the above examples, the first mesh 1 breaks the jet 3 into a smaller spray 5. The resulting spray 5 from the first mesh 1*a*, then hits a second mesh 1*b*, which further breaks down the spray 5.

In this way, a series of two meshes 1*a, b* is formed. The meshes 1*a, b* in the series act to sequentially break the jet into a fine spray 5. For example, the first mesh 1*a* breaks the jet 3 into a spray 5, and the second mesh 1*b* breaks the spray 5 into a finer spray 5.

The meshes 1*a, b* in the series may be of different weave and/or may have different size openings 9 and/or may be formed of different size and shape wires 7. Alternatively the meshes 1 *a, b* may be the same. The meshes 1*a, b* may be aligned, so that the first set of wires 7*a* in each mesh 1*a, b* in the series are parallel. Alternatively, the meshes 1*a, b* may be rotated around an axis through the center of the series (i.e. down the path the stream 3 follows) relative to one another.

The distance between the first mesh 1*a* and the nozzle 21 is shown by x in FIG. 12. x should be at least 0.1 mm, and at most 500 mm. The distance between the first mesh 1*a* and the second mesh 1*b* is shown by y in FIG. 12. y should be at least 0.1 mm. At most x+y is also 500 mm, so that the second mesh 1*b* is at most 500 mm from the nozzle 21. In some examples, x and y may both be between 0.1 mm and 200 mm. Optionally, x and y may be between 0.1 mm and 100 mm.

One or both of the meshes 1*a, b* may be moveable, in a similar manner as discussed above. This further alters the convergent and divergent effects of the spray 5, with a first spacer mechanism provided to move the first mesh 1*a*, and a second spacer mechanism provided to move the second mesh. The spacer mechanisms provide a system for moving the meshes 1*a,b* and varying the spray 5 characteristics.

In one example, each mesh 1 may be moved independently, such that both of the meshes 1*a, b* are moveable relative to each other, and the nozzle 21.

In another example, the meshes 1*a, b* may be in a fixed relationship so that they move together as a unit, and only x is varied. The minimum and maximum distances between the first mesh 1*a* and the nozzle 21, are as discussed above.

In another example, one of the meshes 1*a, b* may be moveable, relative to the nozzle 21 and the other meshes 1*a, b*, whilst the other mesh 1*a, b* is fixed in position. In some cases, the moveable mesh 1*a, b* may the mesh 1*a* closest to the nozzle 21. In other cases, it may the mesh 1*b* further from the nozzle 21. The minimum and maximum distance between the first mesh 1*a* and the nozzle 21, the minimum distance between the meshes 1*a, b* and the maximum distance between the nozzle 21 and the second mesh 1*b* are as discussed above.

In some examples it may be the nozzle 21 that is moved, instead of or as well as than the meshes 1*a, b*, so the distance between the nozzle 21 and the barrier(s) can also be varied by moving the nozzle 21.

As discussed above, there are a variety of different arrangements. In one example, there may be a single barrier 1 and a nozzle 21. In this case, the distance (x) between the barrier 1 and the nozzle 21 may be varied by moving the nozzle 21 and/or by moving the barrier 1. In another example, there may be multiple barriers 1. In a first case, the spacing between each of the barriers 1 may be varied by moving the barriers 1. The nozzle 21 may also optionally be moved to vary the distance between the nozzle 21 and the barriers 1. In an alternative case, the spacing between the barriers 1 may be fixed, but the distance between the nozzle 21 and the barriers 1 can be varied by moving the nozzle 21 and/or moving the barriers 1 as a set.

In the above examples, the planes of the meshes 1 are parallel to each other, and perpendicular to the centerline C of the nozzle. In other examples, the meshes 1 may be arranged at different angles to each other, and/or to the centerline of the nozzle 21.

It will be appreciated that any number of meshes 1 may be provided in a series, and some or all of the meshes 1 may be moveable via spacer means, as discussed above, to vary the spray 5. The minimum and maximum distance between the first mesh 1*a* and the nozzle 21, the minimum distance between the meshes 1 is as discussed above. The spacing between the meshes 1 is as discussed above. As discussed above, where meshes 1 are provided in a series, they act to sequentially break down the spray 5.

Any suitable nozzle 21 may be used with a series of meshes 1.

Figure 13A:
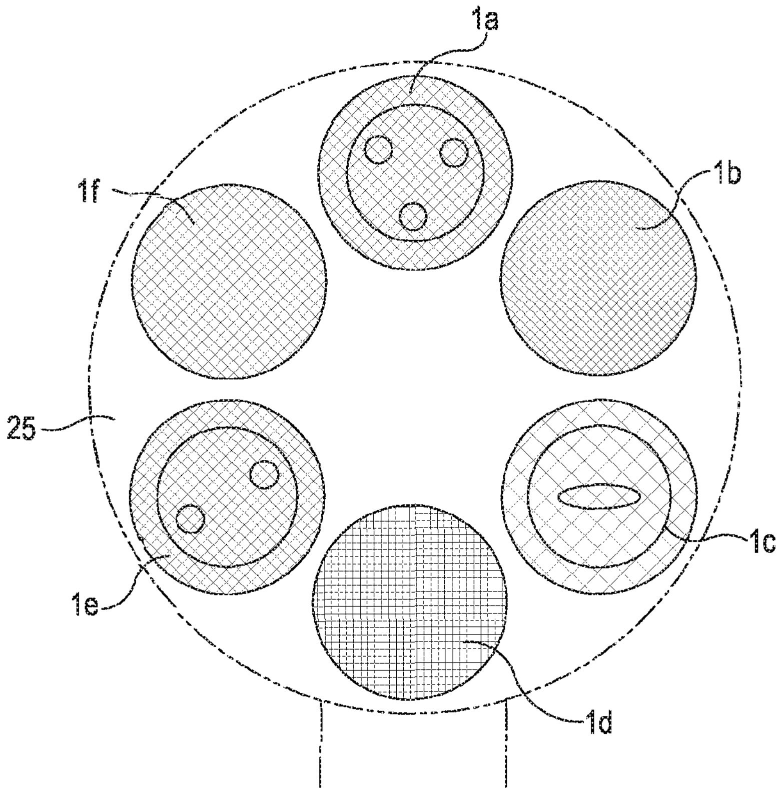
FIG. 13A illustrates an example of an alternative arrangement of a holder for the shower head of FIG. 2A.

In the example discussed above, the holder 25 there is a single mesh 1 in each plane. In other words, the jet 3 only passes through a single mesh 1 at any given distance from the nozzle 21. It will be appreciated that in some examples, as shown in FIG. 13A, the holder 25 may include a number of different meshes 1*a-f* arranged over the surface of the holder 25.

Each of the meshes 1 in the group may have a different weave and/or opening size and/or wire size, such that each mesh 1 creates a different effect in the spray 5. In one example, some of the meshes 1 may be three dimensional, or include three dimensional areas.

In one example, one or more nozzles 21 may be provided and/or arranged such that water is provided through all meshes 1*a-f*, creating a variety of patterns.

In other examples, nozzle(s) 21 may be provided and/or arranged such that a chosen one or more of the meshes 1*a-f* held in the holder 25 is used, without using all meshes 1. The holder 25 may be arranged to move the meshes 1 to bring the selected mesh(es) 1 into register with the nozzle(s) 21. This may be through any suitable mechanism such as a cam mechanism, a screw thread, a lever or a ratchet.

In some examples, one or more of the meshes may be omitted, so that the shower head opens directly to the nozzle 21 at that point.

In at least some examples, each of the meshes 1*a-f* may be able to tilt relative to the plane in which they are held, or may be fixed in a tilted position.

In some examples, there may be two or more holders 25 (only one shown), arranged in series, each having one or more meshes 1. In one example, each holder 25 may be arranged to select one of the meshes 1 for the stream 3 of water to pass through. The mesh 1 from the first holder 25 may be independently selected from the mesh 1 from the second holder 25. Therefore, in the example where each holder 25 includes six meshes 1, thirty six different combinations are provided, each providing a different pattern in the output spray 5.

Furthermore, the distance between the holders 25 may be altered, as discussed above for single meshes 1 in series.

In some examples, one of the holders 25, for example the first, may have a single mesh 1.

Figure 13B:
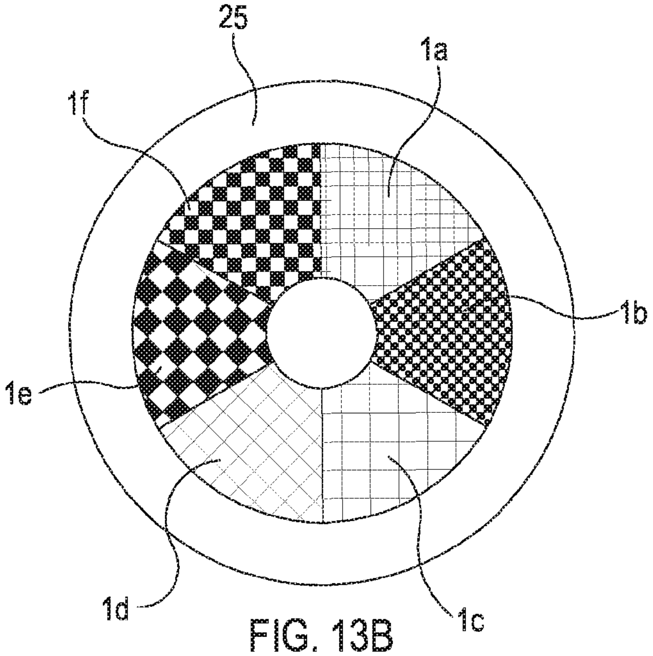
FIG. 13B illustrates a further example of an alternative arrangement of a holder for the shower head of FIG. 2A.

In an alternative example, shown in FIG. 13B, the mesh 1 may be formed of a single continuous mesh 1, with regions 1*a-f* having different weave and/or opening size and/or wire size, such that the different regions produce different effects in the spray 5. In one example, some of the regions 1*a-f* may be three dimensional, or include three dimensional areas.

As with the example of the holder 25 having a number of meshes 1, the nozzles 21 and regions may be arranged such that the jet 3 only passes through a single region, or a subset of the regions, at once, and the holder 25 may be moveable in some way to bring the different regions into register with the water. As discussed above, one or more of the regions may not include any mesh 1.

In at least some, but not all examples, the shower head 11 may include an air induction feature that mixes the water stream from the nozzle 21 with air. This reduces the consumption of water. The air induction feature itself may affect the spray effect.

In all of the examples discussed above, the mesh 1 is described as being formed of interlaced wires. It will, however, be appreciated, however, that this is just one example of a mesh 1.

In another example, the wires in the first direction 7*a*, and the wires in the second direction 7*b* may be arranged in different planes, provided adjacent to one another.

In at least some of these examples, the holder 25 may be arranged to allow the separate planes to be moved apart. This allows any material that is potentially clogging the mesh 1 to be removed.

In another example, an anti-clog feature may be provided by having two or more relatively coarse meshes placed close together to provide the same effect as a single relatively fine mesh arrangement. In order to unclog, the coarse meshes can be moved apart and water/fluid allowed to run through to release unwanted debris from the entire arrangement. It is easier for unwanted debris to pass through each separated coarse mesh while moved apart, than to pass through the effectively fine mesh when the constituent meshes are close together.

In other examples, the mesh may be provided by any sheet of material with holes formed in it, where the edge of the holes have a curved radius, arranged to encourage the Coanda effect. For example, the mesh may be formed by etching, punching, drilling, laser cutting, or 3D printing (or additive manufacturing).

In the above examples, a mesh 1 is used to break up a jet 3 and form a spray 5 based on the Coanda effect. In yet further examples, the mesh 1 may be arranged to discourage the Coanda effect, for example by using square section wires.

The mesh 1 is just one example of a barrier that can be used to break up a jet into a spray, and direct the resulting streams in the spray. In other examples, any suitable dispersing barrier (atomizer) could be used. For example, the barrier could comprise a plate, having through holes arranged at different angles to the plane of the surface of the barrier. This acts to break up the jet 3 and direct the resulting streams in the spray.

In the examples discussed above, the holder 25 is fixed in the shower head 11. However, it will be appreciated that this may not always be the case, and the holder 25 may be removably detachable in order to allow the holder 25 with the mesh 1 to be removed, and cleaned, or a different mesh 1 to be provided. The holder 25 may be made removable by any suitable means, such as screw threads, bayonet, clip fits, friction fit, snap fit and the like.

The nozzle(s) 21 may be arranged so that the jet(s) 3 can be directed at a particular location on the mesh 1. This could be by moving the nozzle 21, or changing the angle of the nozzle 21. This can be controlled by a user, and may be used to form 3D shapes in different regions of a compliant mesh 1. The 3D shapes may be ripples, ridges or valleys, or any of the shapes described in relation to FIGS. 11A-11D. This can also be used to direct the jet 3 to a particular mesh 1, or region of the mesh 1 (such as a 3D region). This can be used instead of or as well as movement of the selected mesh(es) 1 into register with the jet 3, as discussed above.

In the above examples, the wires 7 are made from rubber. It will be appreciated that the wires 7 may be formed of any suitable resiliently deformable or compliant material, and may be elastic or not.

In the above example, the mesh 1 is held in a holder 25 separate to the housing 15 of the shower head 11. It will be appreciated that this is by way of example only. Any suitable holder 25 may be used to provide a means for holding the mesh 1.

In some of the above examples, the shower head 11 and holder 25 are arranged to allow the distance between the nozzle 21 and mesh(es) 1 to be varied. It will be appreciated that any suitable mechanism may be used to modify this distance, and the holder 25 may be arranged in any way that allows the distance to be modified. Furthermore, in some examples, the distance between the nozzle 21 and the mesh 1 may be fixed, such that it cannot be varied.

The construction of the shower head 11 discussed above is by way of example only. The shower head 11 may be of any suitable construction. Furthermore, the shower head 11 may be incorporated into a larger handset 27. The shower head 11 may be separate to the handset 27, and fixable by screw threads or other mechanism, or may be integrally incorporated into the handset 27.

Alternatively, the shower head 11 may be fixed directly to a wall or ceiling water delivery outlet (not shown), and is not part of a handset 27.

In the above description, the water passes through the mesh 1 in the form of a jet 3. A jet 3 is a stream of water that is projected through a nozzle 21 aperture to focus it and usually results in an increase in velocity. In the above example, the jet 3 is created by a nozzle 21. However, it will be appreciated that the jet may be created in any suitable way. Furthermore, the mesh(es) 1 may be used with any directed stream of water, not necessarily just a jet 3.

As discussed above, there are a number of different parameters that may be varied. These include: the number of jets 3 and nozzles 21, the angle of the jets 3, the size of the jets 3, the type and speed of movement of the nozzle(s) 21, the distance between the mesh(es) 1 and jet(s) 3 and the distance between different meshes 1, the type of mesh 1, the size of the mesh 1, the relative angles of the mesh(es) 1 to each other and the center axis C of the nozzle 21, the type and speed of movement of the mesh(es) 1.

All of these parameters may be controlled, separately or in combination, to vary the characteristics of the spray 5, creating different and controllable experiences for the user. The inventor has realized this and provided a step change forward in this field of technology.

Furthermore, typically, sufficient velocity is required in a jet 3 for creating spray patterns 5. However, the use of the rotating nozzles 21 and/or air induction and/or mesh 1 allows lower pressure to be used to achieve different spray effects.

What is claimed is:

1. An ablutionary fitting comprising:

an outlet for providing a stream of water;

a dispersing barrier arranged in the stream, such that liquid passing through the dispersing barrier is broken up into a plurality of smaller streams, forming a spray, wherein the smaller streams are at least in part directed by the dispersing barrier, and wherein the stream of water exits the outlet directly through the dispersing barrier; and a first spacer mechanism configured to alter a distance between the dispersing barrier and the outlet;

wherein the outlet and the dispersing barrier are driven to rotate about an axis substantially perpendicular to a plane of the dispersing barrier in at least one of a clockwise and a counterclockwise direction; and wherein rotation of the dispersing barrier is independent of rotation of the outlet.

2. The ablutionary fitting of claim 1, wherein the dispersing barrier comprises a mesh.

3. The ablutionary fitting of claim 2, wherein the mesh is formed of a first set of substantially parallel wires running in a first direction, and a second set of substantially parallel wires running in a second direction, substantially perpendicular to the first direction.

4. The ablutionary fitting of claim 3, wherein:

the first set of wires comprises wires of a first shape cross section and first size; the second set of wires comprises wires of a second shape cross section and second size; and at least one of (a) the first shape cross section is different from the second shape cross section or (b) the first size is different from the second size.

5. The ablutionary fitting of claim 1, wherein the dispersing barrier comprises a plate, having a plurality of through passages, the through passages being angled with respect to a surface of the plane.

6. The ablutionary fitting of claim 1, wherein:

the outlet is able to move at different speeds; and the speed of movement, at least in part, controls characteristics and patterns of the spray.

7. The ablutionary fitting of claim 1, wherein the outlet comprises one or more nozzles, each of the one or more nozzles having an outlet aperture arranged to form the stream as a jet.

8. The ablutionary fitting of claim 7, wherein:

the nozzle includes a plurality of outlet apertures;

each outlet aperture arranged to provide a jet; and the number and size of the outlet apertures at least in part determines characteristics and pattern of the spray.

9. The ablutionary fitting of claim 8, wherein:

the outlet apertures are arranged over the surface of the nozzle; and the pattern of the outlet apertures at least in part determines the characteristics and pattern of the spray.

10. The ablutionary fitting of claim 8, wherein:

each outlet aperture forms a first angle between a first axis perpendicular to a plane defined by the dispersing barrier and an axis perpendicular to the outlet aperture;

at least some of the plurality of outlet apertures form different first angles to each other; and the first angle of each outlet aperture at least in part determines the characteristics and pattern of the spray.

11. The ablutionary fitting of claim 8, wherein:

the circumferential position of each outlet aperture is described by a second angle defined as a rotational angle in the plane of the dispersing barrier;

at least some of the plurality of outlet apertures form different second angles to each other; and the second angle of each outlet aperture at least in part determines the characteristics and pattern of the spray.

12. The ablutionary fitting of claim 1, wherein the distance that the dispersing barrier is held in front of the outlet at least in part determines characteristics and pattern of the spray.

13. The ablutionary fitting of claim 1, wherein the ablutionary fitting comprises at least two dispersing barriers.

14. The ablutionary fitting of claim 13, wherein at least some of the dispersing barriers are arranged consecutively, such that liquid passes through the dispersing barriers in series.

15. The ablutionary fitting of claim 14, further comprising a second spacer mechanism for altering the distance between the dispersing barriers, wherein the distance between the dispersing barriers at least in part determines characteristics and pattern of the spray.

16. The ablutionary fitting of claim 15, wherein at least some of the dispersing barriers are arranged in the same plane, and the dispersing barriers form different patterns in the spray.

17. The ablutionary fitting of claim 16, wherein a first set of dispersing barriers is arranged in a first plane, and a second set of dispersing barriers is arranged in a second plane, such that a selected dispersing barrier from the first set and a selected dispersing barrier from the second set are arranged consecutively, such that liquid passes through the selected dispersing barriers in series.

18. The ablutionary fitting of claim 1, wherein the dispersing barrier defines a plane, the plane substantially perpendicular to the stream of water, wherein at least part of the dispersing barrier projects away from the plane, such that the dispersing barrier is three dimensional.

19. The ablutionary fitting of claim 1, wherein rotation of the outlet is independent of rotation of the dispersing barrier.

20. An ablutionary fitting comprising:

an outlet for providing a stream of water;

a dispersing barrier arranged in the stream, such that liquid passing through the dispersing barrier is broken up into a plurality of smaller streams, forming a spray, wherein the smaller streams are at least in part directed by the dispersing barrier, and wherein the stream of water exits the outlet directly through the dispersing barrier; and a first spacer mechanism configured to alter a distance between the dispersing barrier and the outlet;

wherein the outlet and the dispersing barrier are driven to rotate about an axis substantially perpendicular to a plane of the dispersing barrier in at least one of a clockwise and a counterclockwise direction; and wherein the dispersing barrier comprises a mesh, and wherein the mesh is formed of a first set of substantially parallel wires running in a first direction, and a second set of substantially parallel wires running in a second direction, substantially perpendicular to the first direction.

* * * * *